6739X
J. Barron,
Water Filter.
Patented Aug. 30, 1831.
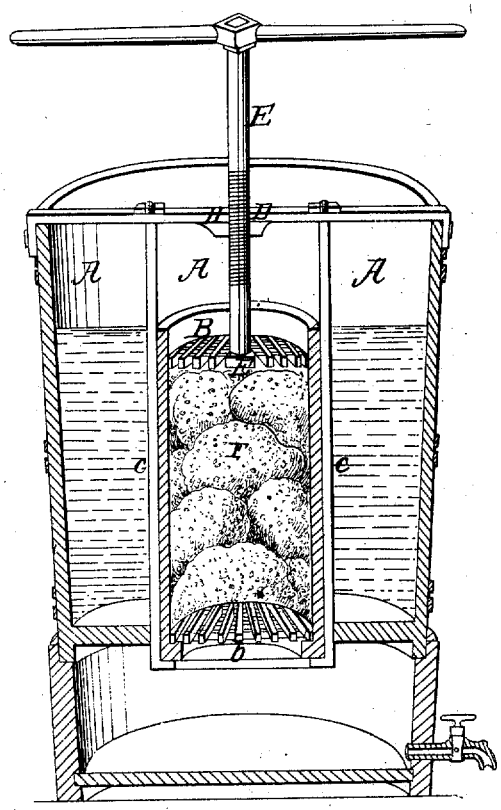
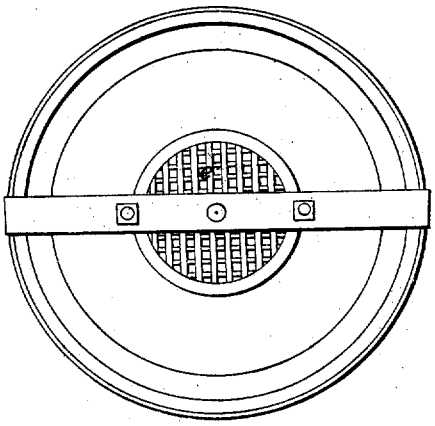
N. PETERS, PHOTO-LITHOGRAPHER, WASHINGTON, D. C.

James Barron, of the U.S. Navy
Letters Patent. 6739X

The schedule referred to in these Letters Patent, and making part of the same containing a description in the words of the said James Barron of the United States Navy, himself of his improvement, being a machine for filtrating water and other liquids.

---

Be it known that I. James Barron of the United States Navy, now of Philadelphia, in the County of Philadelphia, and State of Pennsylvania, have [made] an improvement, being a machine for filtrating water and other liquids; which is described as follows - make a vessel of wood or any other suitable material, round, and hooped with iron; or it may be of any figure sufficiently large and strong [and] suitable for the purpose intended.
At the bottom of the vessel make an opening, and insert a cylinder therein with a grating at the bottom thereof. The cylinder is made of wood, each stave of which has a shoulder or projection on its lower end, and when the staves are put together a projection or rest is formed all around for the lower grating to rest on. To hold this cylinder firmly in its place, when the machine, is in operation, an iron rod is placed on each side of the cylinder with its lower end bent at a right angle under its bottom, and its upper end passing through the bottom of the tub or vessel, and iron bar, and secured by a screw and tap.
On the top of the aforesaid vessel fix a cross bar, having a female screw in the centre - Thro' this bar let a male screw of sufficient length pass, having at its upper end a crank handle or cross for turning it, and at its lower end a grating similar to the one in the bottom of the cylinder. Operation. having turned the screw till the grating is sufficiently high, place a proper quantity of sponge between it and the bottom of the cylinder; screw down the sponge till water will pass through - pour in the water to be filtered, and it will percolate thro' the sponge deprived of its impurities. In all cases to obtain clean water it is only necessary to have a proper quantity of the sponge sufficiently

6739X composed. What I claim as my invention is the before described machine for filtrating water & other liquids thro' sponge composed.

Witnesses
Aaron Wolff
John Staples

James Barron

Exd Mgl.

Bas nos.